(12) United States Patent
Sakashita et al.

(10) Patent No.: US 11,270,435 B2
(45) Date of Patent: Mar. 8, 2022

(54) APPARATUS, METHOD, AND RECORDING MEDIUM

(71) Applicant: YOKOGAWA ELECTRIC CORPORATION, Tokyo (JP)

(72) Inventors: Hirofumi Sakashita, Tokyo (JP); Yukihiro Ina, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 158 days.

(21) Appl. No.: 16/741,689

(22) Filed: Jan. 13, 2020

(65) Prior Publication Data

US 2020/0273174 A1  Aug. 27, 2020

(30) Foreign Application Priority Data

Feb. 21, 2019 (JP) .............................. JP2019-029896

(51) Int. Cl.
*G06K 9/00* (2006.01)
*G06T 7/00* (2017.01)
*G06N 20/00* (2019.01)
*G06N 3/08* (2006.01)

(52) U.S. Cl.
CPC ............. *G06T 7/0014* (2013.01); *G06N 3/08* (2013.01); *G06N 20/00* (2019.01); *G06T 7/97* (2017.01); *G06T 2207/20081* (2013.01); *G06T 2207/20084* (2013.01); *G06T 2207/30188* (2013.01)

(58) Field of Classification Search
CPC ...... B60T 11/108; B60T 13/22; B60T 15/041; G06K 9/00127; G06K 9/00624; G06K 9/6256; G06K 9/6262; G06N 20/00; G06N 3/08; G06T 2207/20081;
(Continued)

(56) References Cited

U.S. PATENT DOCUMENTS

2009/0234626 A1\* 9/2009 Yu ........................ G06N 20/00 703/11
2020/0167914 A1\* 5/2020 Stamatoyan ........... G06N 20/00

FOREIGN PATENT DOCUMENTS

JP H10301915 A 11/1998
JP 2009063509 A 3/2009

OTHER PUBLICATIONS

Office Action issued for counterpart Japanese Application No. 2019-029896, issued by the Japan Patent Office dated Mar. 16, 2021 (drafted dated Mar. 9, 2021).
(Continued)

*Primary Examiner* — Xin Jia

(57) ABSTRACT

An apparatus is provided, which includes an obtainment portion configured to obtain a plurality of images corresponding to respective values of a parameter that affects occurrence of a target event; a generation portion configured to generate, for each of a plurality of thresholds relating to the parameter, a learning data set in which at least a part of the plurality of images is each given an attribute value, the attribute value varying based on whether the threshold is exceeded; a learning processing portion configured to perform, for each generated learning data set, learning processing on an estimation model that estimates an attribute of an image in response to input of the image; and an evaluation value output portion configured to output, for each estimation model, an evaluation value according to an estimation error of the estimation model.

10 Claims, 6 Drawing Sheets

(58) Field of Classification Search
CPC . G06T 2207/20084; G06T 2207/30188; G06T 7/0014; G06T 7/97
See application file for complete search history.

(56) References Cited

OTHER PUBLICATIONS

Extended European Search Report for European Patent Application No. 20151886.7, issued by the European Patent Office dated Jul. 27, 2020.
Georghiades A S et al: "From Few To Many:Illumination Cone Models for Face Recognition Under Variable Lighting and Pose", IEEE Transactions On Pattern Analysis and Machine Intelligence, IEEE Computer Society, USA,vol. 23, No. 6, Jun. 1, 2001 (Jun. 1, 2001),pp. 643-660, XPOOIII0806, ISSN: 0162-8828.
Takuya Kano et al., Automatic classification of breast density on CT images by using deep CNN, Tokyo, IEICE Technical Report, 2016, vol. 116, No. 39, pp. 21-25.

* cited by examiner

APPARATUS, METHOD, AND RECORDING MEDIUM

The contents of the following Japanese patent application(s) are incorporated herein by reference:
2019-029896 filed in JP on Feb. 21, 2019.

BACKGROUND

1. Technical Field

The present invention relates to an apparatus, a method, and a recording medium.

2. Related Art

Conventionally, various techniques for performing analysis using images have been proposed. For example, in the technique described in Patent Document 1, image analysis is performed on a plurality of images corresponding to respective values of a dosage, a characteristic amount (area or luminance value of a specific region) is calculated, and from the relationship between the dosage and the characteristic amount, the dosage at which a reaction occurs is obtained.

In addition, in the technique described in Non-Patent Document 1, using four types of images classified according to breast density, an evaluation target image is classified into any one of the four types by using a model that has been subjected to learning processing.

[Patent Document 1] Japanese Patent No. 2009-63509

[Non-Patent Document 1] KANO, Takuya, ZHOU Xiangrong, KOYASU Hiromi, YOKOYAMA Ryujiro, HARA Takeshi, MATSUO Masayuki, FUJITA Hiroshi, Automatic Classification of Breast Density on CT Images by Using Deep CNN. Tokyo: IEICE Technical Report, 2016, Vol. 116, No. 39, pages 21 to 25.

However, in conventional techniques, the parameter value at which the target event occurs cannot be easily determined.

SUMMARY

In order to solve the above problem, an apparatus is provided in a first aspect of the present invention. The apparatus may include an obtainment portion configured to obtain a plurality of images corresponding to respective values of a parameter that affects the occurrence of a target event. The apparatus may include a generation portion configured to generate, for each of a plurality of thresholds relating to the parameter, a learning data set in which at least a part of the plurality of images is each given an attribute value, the attribute value varying based on whether the threshold is exceeded. The apparatus may include a learning processing portion configured to perform, for each generated learning data set, learning processing on an estimation model that estimates an attribute of an image in response to input of the image. The apparatus may include an evaluation value output portion configured to output, for each estimation model, an evaluation value according to an estimation error of the estimation model.

The apparatus may include a determination portion configured to determine a value of the parameter at which the target event occurs based on the threshold, among the plurality of thresholds, corresponding to the estimation model having the smallest evaluation value.

The learning processing portion may repeatedly perform learning processing on each estimation model using the corresponding learning data set. The apparatus may include a determination portion configured to determine a value of the parameter at which the target event occurs based on a threshold, among the plurality of thresholds, corresponding to the estimation model in which the evaluation value becomes less than or equal to a reference value with the smallest number of times of learning.

The generation portion may generate the learning data set for each of the plurality of thresholds using images, among the plurality of images, corresponding to values of the parameter, the values being within a range including the threshold.

The obtainment portion may obtain a plurality of images corresponding to respective values of each of a plurality of parameters that affect occurrence of the target event. The generation portion may generate, for each of a plurality of combinations of thresholds relating to the plurality of parameters, the learning data set in which each of the plurality of images is given an attribute value, the attribute value varying based on whether each of the thresholds included in each of the combinations is exceeded.

The learning processing portion may perform learning processing on each of a plurality of estimation models having the same initial condition, using a corresponding one of a plurality of learning data sets generated for the plurality of thresholds.

The learning processing portion may perform transfer learning using a model on which learning processing has been performed as the estimation model. The estimation model may estimate the attribute value of an image in response to input of the image. In response to input of an image, the estimation model may estimate, for at least one attribute value, a probability that the image has the attribute value.

The target event may be a drug reaction, and the parameter may be a condition for administration of the drug.

A method is provided in a second method of the present invention. The method may include an obtainment step of obtaining a plurality of images corresponding to respective values of a parameter that affects occurrence of a target event. The method may include a generation step of generating, for each of a plurality of thresholds relating to the parameter, a learning data set in which at least a part of the plurality of images is each given an attribute value, the attribute value varying based on whether the threshold is exceeded. The method may include a learning processing step of performing, for each generated learning data set, learning processing on an estimation model that estimates an attribute of an image in response to input of the image. The method may include an evaluation value output step of outputting, for each estimation model, an evaluation value according to an estimation error of the estimation model.

A recording medium having recorded thereon a program is provided in a third aspect of the present invention. The program may cause a computer to obtain a plurality of images corresponding to respective values of a parameter that affects occurrence of a target event. The program may cause the computer to generate, for each of a plurality of thresholds relating to the parameter, a learning data set in which at least a part of the plurality of images is each given an attribute value, the attribute value varying based on whether the threshold is exceeded. The program may cause the computer to perform, for each generated learning data set, learning processing on an estimation model that estimates an attribute of an image in response to input of the image. The program may cause the computer to output, for each estimation model, an evaluation value according to an estimation error of the estimation model.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention, but the following embodiments do not limit the invention according to the claims. In addition, not all the combinations of the features described in the embodiments are essential for the solving means of the invention.

Figure 1:
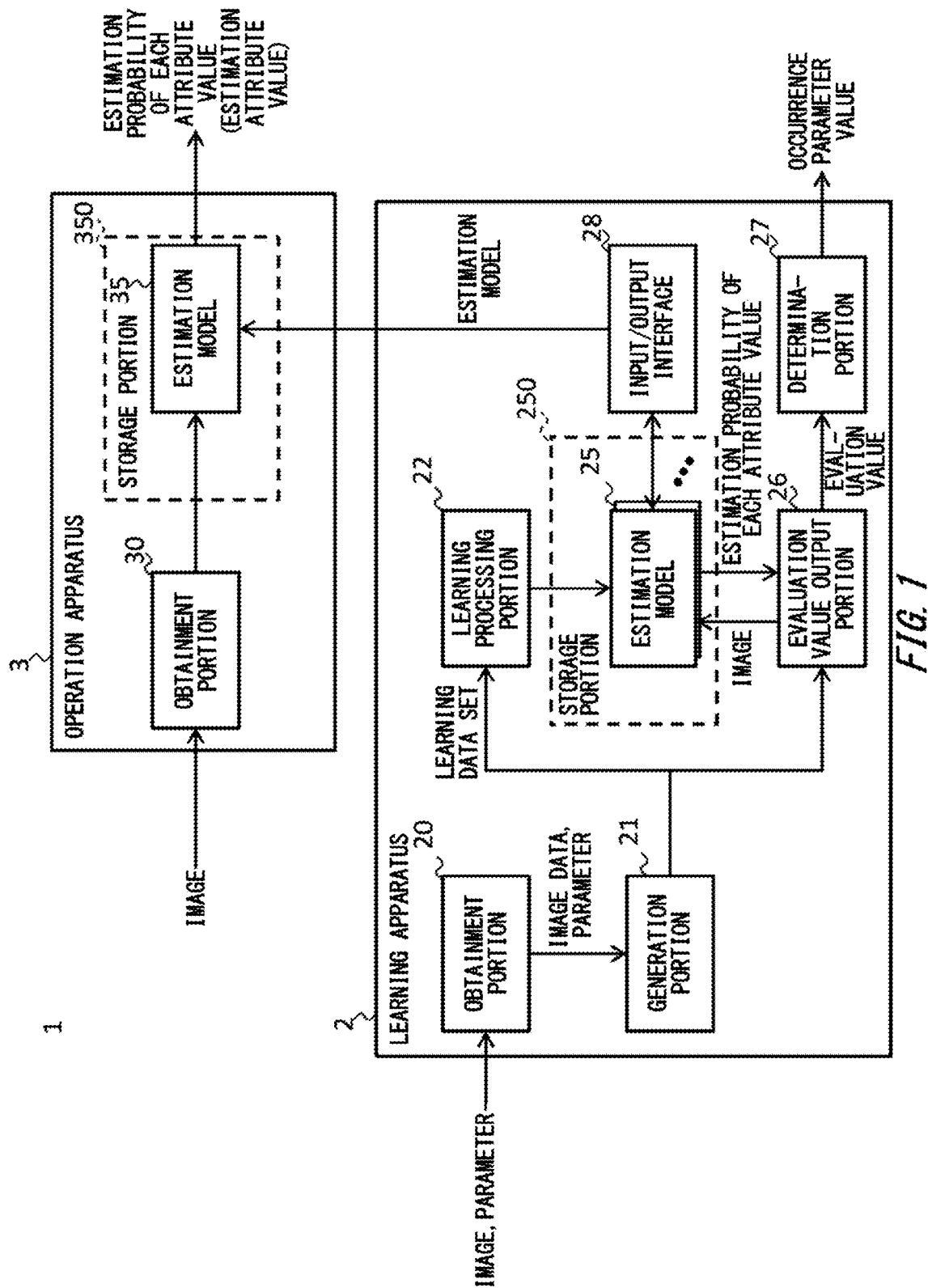
FIG. 1 shows a system 1 according to the present embodiment.

[1. System 1] FIG. 1 shows a system 1 according to the present embodiment. The system 1 includes a learning apparatus 2 for performing learning processing on an estimation model 25, and includes an operation apparatus 3 for operating the estimation model 25 on which learning processing has been performed. In the present embodiment, for example, a target event may be a drug reaction.

[1.1. Learning apparatus 2] The learning apparatus 2 is an example of an apparatus, and includes an obtainment portion 20, a generation portion 21, a learning processing portion 22, a plurality of the estimation models 25, an evaluation value output portion 26, a determination portion 27, and an input/output interface 28.

[1.1.1. Obtainment portion 20] The obtainment portion 20 obtains a plurality of images corresponding to respective values of a parameter that affects the occurrence of the target event. For example, the obtainment portion 20 may obtain a plurality of images with the images being associated with the values of the parameter.

Each image may indicate whether or not the target event is occurring. For example, the subject of each image may be different in at least one of the shape, size, luminance value, hue, saturation, brightness, transmittance, or the like depending on whether or not the target event is occurring. For example, the subject may be any one of an organ, tissue, a cell, an organelle (for example, a nucleus), an organic substance (for example, a protein or a nucleic acid), or the like of an organism, and may be collected from a living body.

The target event may be a drug reaction, for example, a reaction of a drug administered to the subject. In the present embodiment, for example, the target event may be a 50% reaction of a maximum drug reaction (also simply referred to as a 50% reaction). That is, the target event may be a reaction corresponding to EC (half maximum Effective Concentration) 50 or IC (half maximum Inhibitor Concentration) 50. It is noted that the drug reaction may be a function of the medicine that changes the subject, and the subject may be changed to a healthy state or an abnormal state (for example, a state of being destroyed).

The parameter that affects the occurrence of the target event may be a condition for administration of the drug. In the present embodiment, for example, the condition for administration of the drug is the dosage. However, the condition for administration may be temperature, or the time during which the subject is exposed to a state in which the drug is reacting (also referred to as exposure time). In other words, the exposure time is the elapsed time between the administration of the drug and the imaging of the subject.

The values of the parameter may be distributed between an upper limit value and a lower limit value. For example, each of the values of the parameter may be set by an operator and is also referred to as a parameter setting value. The plurality of parameter setting values may be set to be approximately equidistant from each other between the upper limit value and the lower limit value, and as an example, the parameter setting values may be set to be approximately equidistant from each other between the upper limit value and the lower limit value when expressed on a logarithmic scale. The number of parameter setting values may be set according to a required resolution when obtaining the value of the parameter at which the target event occurs (in the present embodiment, for example, the dosage that provides a 50% reaction).

The obtainment portion 20 may obtain each of the images from a storage device (not shown). The obtainment portion 20 supplies the obtained images and parameter to the generation portion 21.

[1.1.2. Generation portion 21] The generation portion 21 generates a plurality of learning data sets. The generation portion 21 may generate, for each of a plurality of thresholds relating to the parameter (in the present embodiment, for example, the dosage), one learning data set in which each of the plurality of images is given an attribute value, the attribute value varying based on whether the threshold is exceeded.

In the present embodiment, for example, the generation portion 21 gives, for each of the thresholds, the attribute value "0" indicating that the drug has reacted less than 50%, to each image, among the plurality of images, corresponding to the dosage that is less than or equal to the threshold, and gives the attribute value "1" indicating that the drug has reacted 50% or more, to each image corresponding to the dosage that is greater than the threshold. The generation portion 21 supplies the generated learning data sets to each of the learning processing portion 22 and the evaluation value output portion 26.

Here, the plurality of thresholds of the parameter may be set in advance so as to be distributed between the upper limit value and the lower limit value of the values of the parameter. For example, the plurality of thresholds may be set to be approximately equidistant from each other between the upper limit value and the lower limit value, and as an example, they may be set to be approximately equidistant from each other between the upper limit value and the lower limit value when the values of the parameter are expressed on a logarithmic scale. In the present embodiment, for example, each threshold is set between each pair of parameter setting values adjacent to each other.

[1.1.3. Learning processing portion 22] The learning processing portion 22 performs learning processing on each of the plurality of estimation models 25 for each generated learning data set. The learning processing portion 22 may perform learning processing by a deep learning method.

[1.1.4. Estimation model 25] In response to the input of an image, each estimation model 25 estimates the attribute of the image. For example, each estimation model 25 may estimate the attribute value (for example, a value of "1" or "0" indicating whether or not the drug is reacting) of the input image. In the present embodiment, for example, each estimation model 25 estimates, for each attribute value, the probability that the input image has the attribute value (for example, the probability that the image has the attribute value "1", or the probability that the image has the attribute value "0". Also referred to as an estimation probability of the attribute value.). In this case, each estimation model 25 returns the estimation probability of each attribute value, and the closer the target event (in the present embodiment, for example, the drug reaction) of the input image is to a state of completely occurring (also referred to as an occurrence state image), the estimation probability of the attribute value 1 is closer to 1.00 (=100%), and the estimation probability of the attribute value 0 is closer to 0 (=0%). Similarly, the farther the target event of the input image is from the occurrence state image, the estimation probability of the attribute value 1 is closer to 0, and the estimation probability of the attribute value 0 is closer to 1.00. Here, the probability is a degree at which the event is expected to occur, and in the present embodiment, for example, the probability is a ratio such as 0.4, but it may be a percentage such as 40%.

Each estimation model 25 may be a neural network, a convolutional neural network (CNN), or a VGG. The VGG is an estimation model developed by Visual Geometry Group, Department of Engineering Science, University of Oxford, and is the estimation model that is disclosed, for example, in "VERY DEEP CONVOLUTIONAL NETWORKS FOR LARGE-SCALE IMAGE RECOGNITION" (ICLR 2015, https://arxiv.org/pdf/1409.1556.pdf) by Karen Simonyan, et al.

Each estimation model 25 may include, in its output layer, a neuron for outputting a value indicating how close the input image is to the target event occurrence state image, and a neuron for outputting a value indicating how far the input image is from the target event occurrence state image. A softmax function may be applied to the output layer, and thereby the estimation model 25 may output values from the two output neurons that total to 1.00 (=100%).

It is noted that in the present embodiment, for example, each estimation model 25 is stored in a storage portion 250 inside the learning apparatus 2. Alternately, each estimation model 25 may be stored on an external server (not shown) of the learning apparatus 2.

[1.1.5. Evaluation value output portion 26] The evaluation value output portion 26 outputs an evaluation value according to an estimation error of each estimation model 25.

For example, the evaluation value output portion 26 inputs each of the images included in the learning data set to the estimation model 25, and obtains the estimation probability of each attribute value of the image. Then, the evaluation value output portion 26 calculates the estimation error for each of the images from the estimation probability of each attribute value, and calculates the evaluation value of the estimation model 25 from the plurality of estimation errors obtained for the plurality of images.

The estimation error may be a value calculated by any method as long as it is a measure indicating the amount of deviation among a set of numerical values. For example, the value may be cross entropy or square error, or may be a value obtained by performing an arithmetic operation such as the four basic arithmetic operations on these values. In the case where cross entropy is calculated as the estimation error, the evaluation value output portion 26 converts the attribute value given to each of the images in the learning data set to a probability in one-hot representation, that is, converts the probability of the attribute value that has been given to an image to 1.00 (=100%), and converts the probability of other attribute values to 0 (=0%). Then, the evaluation value output portion 26 uses the estimation probability $y_k$ of the attribute value obtained from the estimation model 25 (where the subscript "k" is an identification number of the attribute value) and the probability $t_k$ of the attribute value that has been given to the image in one-hot representation, to calculate the estimation error $E=\Sigma(-t_k \times \log(y_k))=-t_1 \times \log(y_1) \ldots -t_K \times \log(y_K)$ (where the subscript "K" is the maximum value of k) for each of the images.

The evaluation value may be a value calculated by any method as long as the value is based on estimation error. In the present embodiment, for example, the evaluation value is a so-called loss value, and the smaller the value is, the higher the estimation accuracy is. The evaluation value may be a value obtained by averaging the estimation errors of each of the images for each estimation model 25. It is noted that the evaluation value may be a value indicating that, the greater the value is, the higher the estimation accuracy is (also referred to as reliability). For example, the reliability may be a value obtained by subtracting the loss value from 1.

[1.1.6. Determination portion 27] The determination portion 27 determines the value of the parameter at which the target event occurs (also referred to as the occurrence parameter value) based on the threshold, among the plurality of thresholds, corresponding to the estimation model 25 having the smallest evaluation value (in the present embodiment, for example, the loss value). It is noted that in the case where the evaluation value indicating higher estimation accuracy as its value is greater (for example, reliability) is used, the determination portion 27 may determine the value of the occurrence parameter based on the threshold corresponding to the estimation model 25 having the greatest evaluation value.

[1.1.7. Input/output interface 28] The input/output interface 28 adjusts settings of the estimation model 25 through a terminal (not shown). For example, the input/output interface 28 may adjust the weights of the edge connecting nodes of the estimation model 25, and the bias value of an output node.

In addition, the input/output interface 28 may read out any of the plurality of estimation models 25 from the storage portion 250 and output it outside the learning apparatus 2. For example, the input/output interface 28 may read out one estimation model 25 that is selected by an operator from the plurality of estimation models 25, and supply it to the operation apparatus 3. The selected estimation model 25 may be the estimation model 25 having the smallest evaluation value (in the present embodiment, for example, the loss value), and may be an estimation model 25 that is obtained by performing further learning processing on this estimation model 25.

[1.2. Operation apparatus 3] The operation apparatus 3 includes an obtainment portion 30 and an estimation model 35.

[1.2.1. Obtainment portion 30] The obtainment portion 30 obtains one or a plurality of images from a storage device (not shown). Each obtained image is an estimation target of an attribute (in the present embodiment, for example, the estimation probability of each attribute value) indicating whether or not the target event is occurring. The obtainment portion 30 supplies the obtained image(s) to the estimation model 35.

[1.2.2. Estimation model 35] The estimation model 35 is the estimation model 25 supplied by the input/output interface 28, and in response to the input of an image from the obtainment portion 30, estimates the attribute of the image. For example, the estimation model 35 outputs, as the estimation probability of the attribute value, a value as the estimation probability of the attribute value 1 that is closer to 1.00 as the input image is closer to the occurrence state image of the target event (in the present embodiment, for example, the drug reaction), and a value as the estimation probability of the attribute value 1 that is closer to 0 as the input image is farther from the occurrence state image. The estimation model 35 outputs, as the estimation probability of the attribute value, a value as the estimation probability of the attribute value 0 that is closer to 0 as the input image is closer to the occurrence state image of the target event, and a value as the estimation probability of the attribute value 0 that is closer to 1.00 as the input image is farther from the occurrence state image. In addition, the estimation model 35 may output the attribute value having the greatest estimation probability as an estimation attribute value. As a result, by inputting an image to the estimation model 35, a value indicating whether or not the drug reaction is occurring is obtained.

It is noted that in the present embodiment, for example, the estimation model 35 is stored in a storage portion 350 inside the operation apparatus 3. Alternately, each estimation model 35 may be stored on an external server (not shown) of the operation apparatus 3.

According to the learning apparatus 2 in the system 1 described above, since a learning data set in which a plurality of images is each given an attribute value, the attribute value varying based on whether the threshold is exceeded, is generated for each of a plurality of thresholds relating to a parameter (in the present embodiment, for example, a dosage), in a learning data set of a threshold not corresponding to an occurrence parameter value at which a target event occurs, the correlation between the attribute value given to the image and the occurrence of the target event is low, and in a learning data set of a threshold corresponding to the occurrence parameter value, the correlation between the attribute value given to the image and the occurrence of the target event is high. Then, since learning processing is performed on the estimation model 25 for each of such a learning data set, and an evaluation value (in the present embodiment, for example, the loss value) of an estimation error by each estimation model 25 is output from the evaluation value output portion 26, in the learning data set not corresponding to the occurrence parameter value, as a result of learning processing being performed by assigning varying attribute values to images that should have the same attribute value, and learning processing being performed by assigning the same attribute value to images that should have varying attribute values, the estimation error is great, and the output evaluation value is great. In addition, in the learning data set of the threshold corresponding to the occurrence parameter value, as a result of learning processing being performed by assigning the same attribute value to images that should have the same attribute value, and learning processing being performed by assigning varying attribute values to images that should have varying attribute values, the estimation error is small, and the output evaluation value is small. Therefore, it is possible to determine the occurrence parameter value at which the target event occurs based on the output evaluation value. For this reason, it is possible to easily determine the occurrence parameter value compared to the case such as where image analysis is performed on the corresponding image of each parameter value and the occurrence parameter value is obtained from the relationship between each parameter value and characteristic amount.

In addition, since the occurrence parameter value is determined based on the threshold corresponding to the estimation model 25 having the smallest evaluation value, it is possible to easily obtain the occurrence parameter value.

In addition, since the target event is a drug reaction and the parameter that affects the occurrence of the target event is the condition for administration of the drug, it is possible to determine the condition for administration of the drug at which the drug reacts from the occurrence parameter value.

Figure 2:
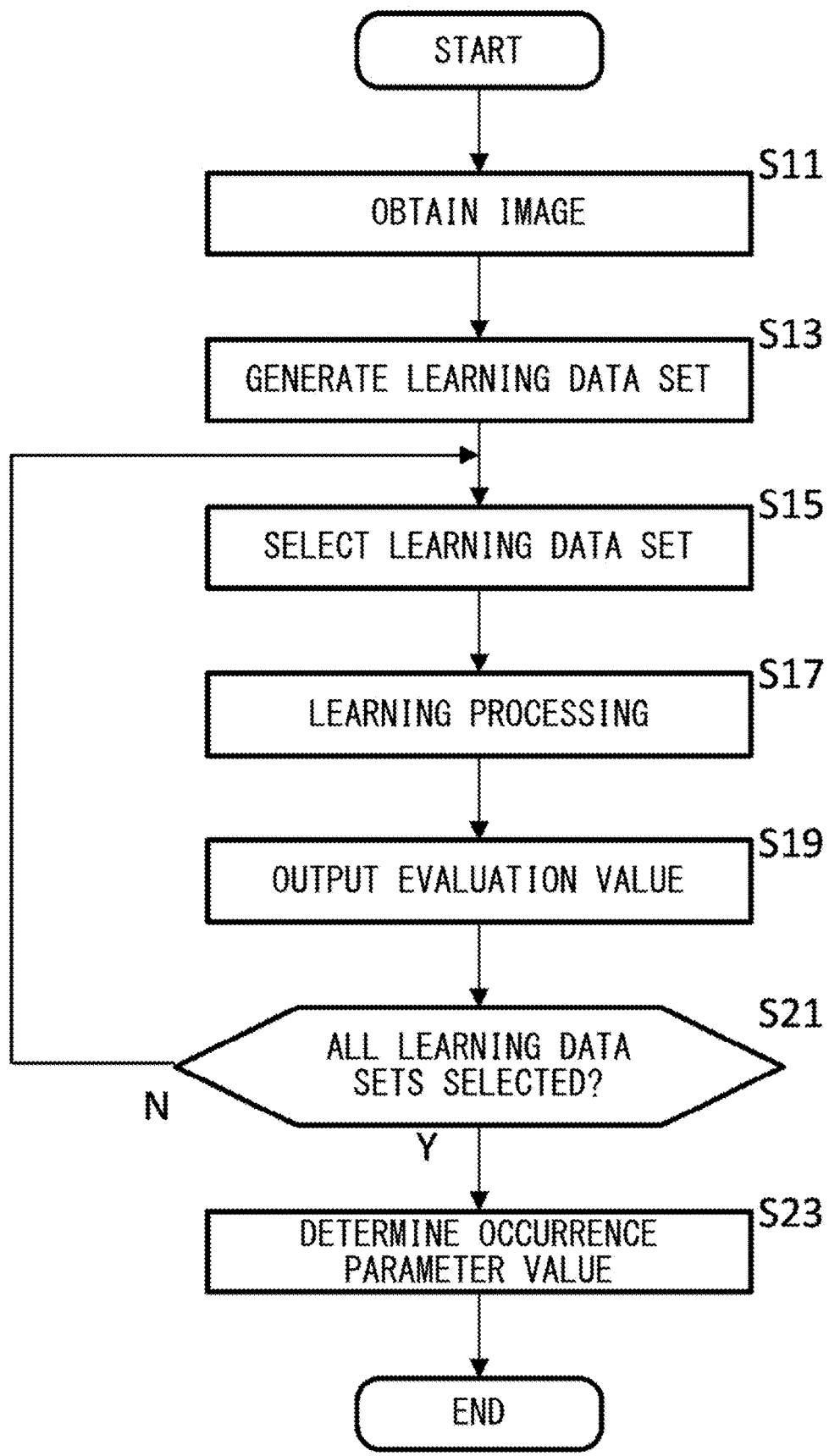
FIG. 2 shows learning processing performed by a learning apparatus 2.

[2. Operation of the learning apparatus 2] FIG. 2 shows the learning processing performed by the learning apparatus 2. The learning apparatus 2 determines the occurrence parameter value by performing the processing of steps S11 to S23.

In step S11, the obtainment portion 20 obtains a plurality of images corresponding to respective values of a parameter (in the present embodiment, for example, the dosage) that affects the occurrence of a target event (in the present embodiment, for example, the 50% reaction of the drug). Each of the images may be an image that is captured by a microscope (for example, an optical microscope or an electron microscope), or may be an image that is captured by another imaging means. In the present embodiment, for example, each of the images is an image obtained by using an optical microscope to capture, as the subject, a cell that is stored in a well of a microplate.

In step S13, the generation portion 21 generates, for each of a plurality of thresholds relating to the parameter, a learning data set in which at least a part of the plurality of images is each given an attribute value, the attribute value varying based on whether the threshold is exceeded. The generation portion 21 may include all of the obtained images in each learning data set.

In step S15, the learning processing portion 22 selects any one of the plurality of learning data sets. The learning processing portion 22 may select any one learning data set, among the plurality of learning data sets, that has not been selected.

In step S17, the learning processing portion 22 may use the selected learning data set to perform learning processing on any one estimation model 25. The learning processing portion 22 may associate each learning data set and each estimation model 25 one-to-one, and use the selected learning data set to perform learning processing on the estimation model 25 corresponding to the learning data set.

The learning processing portion 22 may use the same learning data set to perform learning processing multiple times, the multiple times being a first reference number of times. The first reference number of times may be, for example, within a range of 20 to 400.

Here, the plurality of estimation models 25 that have not been subjected to learning processing may have the same initial condition as each other. The plurality of estimation models 25 having the same initial condition as each other may mean that the weights of the edges between nodes are the same between the estimation models 25 and so are the bias values of output nodes.

In addition, the learning processing portion 22 may perform transfer learning by using a model on which learning processing has been performed as the estimation model 25. In this case, an estimation model 25 that has been subjected to learning processing in advance in an arbitrary source domain may be used. Alternately, the learning processing portion 22 may perform learning processing on an estimation model 25 of which the initial condition is set at random.

In step S19, the evaluation value output portion 26 outputs an evaluation value (in the present embodiment, for example, the loss value) according to the evaluation error of each estimation model 25. For example, the evaluation value output portion 26 may associate identification information of the estimation model 25 with the evaluation value, and display them on a display device (not shown). In the case where the evaluation values of a plurality of estimation models 25 are calculated, the evaluation value output portion 26 may display each evaluation value that has been calculated in association with the corresponding identification information of the estimation model 25. The evaluation value output portion 26, in place of the identification information of the estimation model 25, may display the identification information of the learning data set, may display the identification information of the threshold, and may display the threshold itself. The evaluation value output portion 26 may display the correspondence relationship of the number of times of repeated learning and the evaluation value in graph form.

In step S21, the learning processing portion 22 determines whether or not all of the generated learning data sets have been selected. When the result of determination is negative (Step S21; No), the learning processing portion 22 moves the process to step S15. Thereby, the processing in steps S15 to S19 are repeated, and learning processing is performed on the estimation model 25 of each generated learning data set. When the result of determination is positive (Step S21; Yes), the learning processing portion 22 moves the process to step S23.

In step S23, the determination portion 27 determines the occurrence parameter value based on the threshold corresponding to the estimation model 25 having the smallest evaluation value (in the present embodiment, for example, the loss value), among the plurality of thresholds. The determination portion 27 may determine the threshold itself corresponding to the estimation model 25 having the smallest evaluation value as the occurrence parameter value. The determination portion 27 may display the determined occurrence parameter value on the display device.

It is noted that in the case where the evaluation values of all of the estimation models 25 is a first reference value or more, the determination portion 27 may display an error message on the display device without determining the occurrence parameter value. In the present embodiment, for example, the evaluation value is the loss value indicating that, the smaller the value is within a range of 0 to 1, the higher the estimation accuracy is. The first reference value may be 0.4. The error message may indicate that the administered drug has no effect.

According to the operations described above, since learning processing is performed on each of a plurality of estimation models 25 having the same initial condition by using each of a plurality of learning data sets, unlike the case where the initial conditions vary for each of the estimation models 25, it is possible to prevent the difference of the initial conditions from affecting the evaluation values.

In addition, since transfer learning is performed using as the estimation model 25 a model on which learning processing has been performed, it is possible to reliably converge the learning processing and shorten the processing time of the learning processing.

Figure 3:
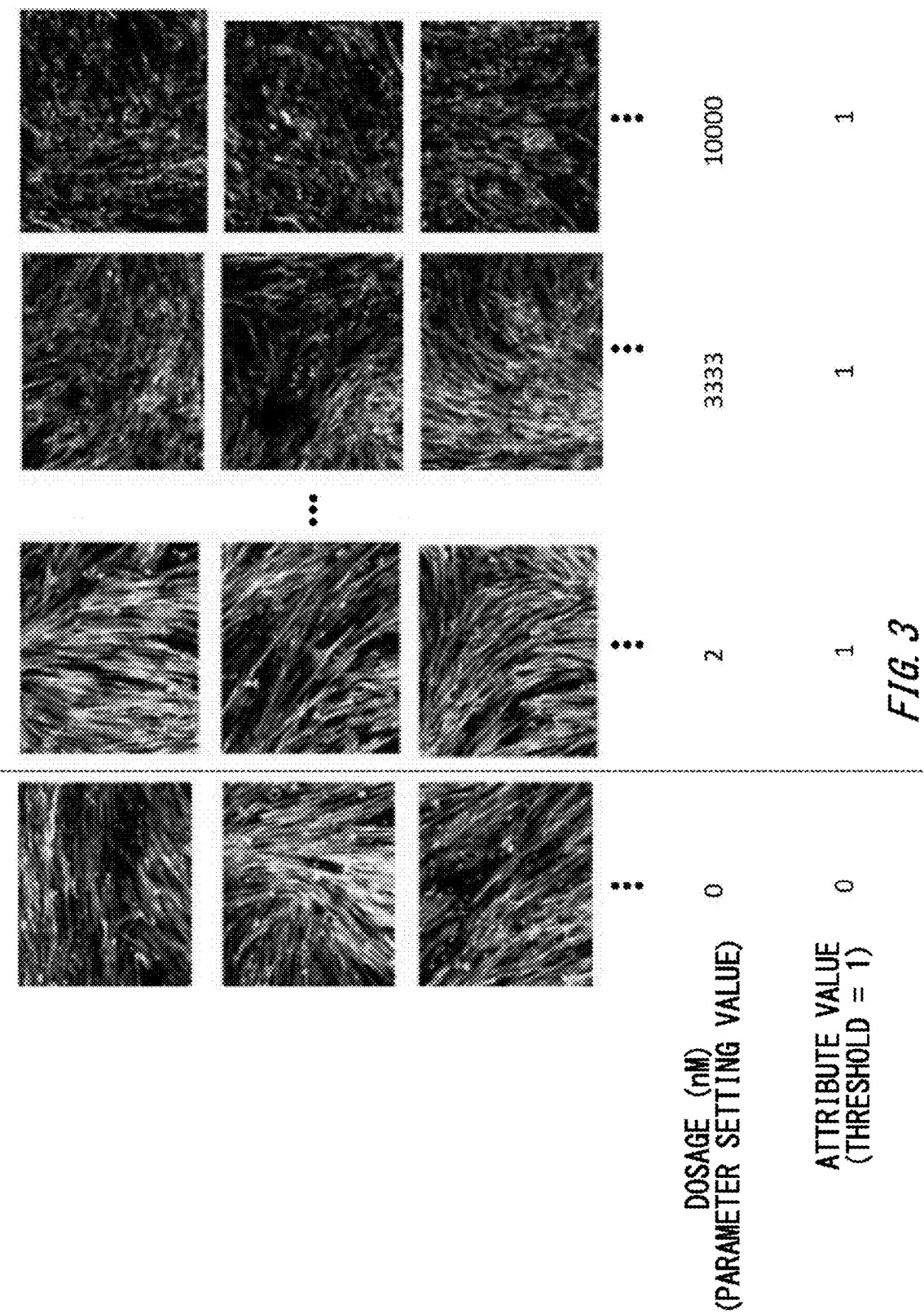
FIG. 3 shows an example of a learning data set.

[3. Example of operation] FIG. 3 shows an example of a learning data set. For example, in the present figure, each image shows a state where a drug has been administered in the dosages of 0, 2, 5, 14, 41, 123, 370, 1,111, 3,333, and 10,000 (nM), where the drug breaks down the fibrous cytoplasm which is the subject (the white part of in the figure). In addition, in the present figure, the threshold of the dosage is set to 1, and the attribute value "0" indicating that the drug has reacted less than 50% is given to each of the images corresponding to a dosage that is the threshold or less, and the attribute value "1" indicating that the drug has reacted 50% or more is given to each image corresponding to a dosage that is greater than the threshold.

Figure 4:
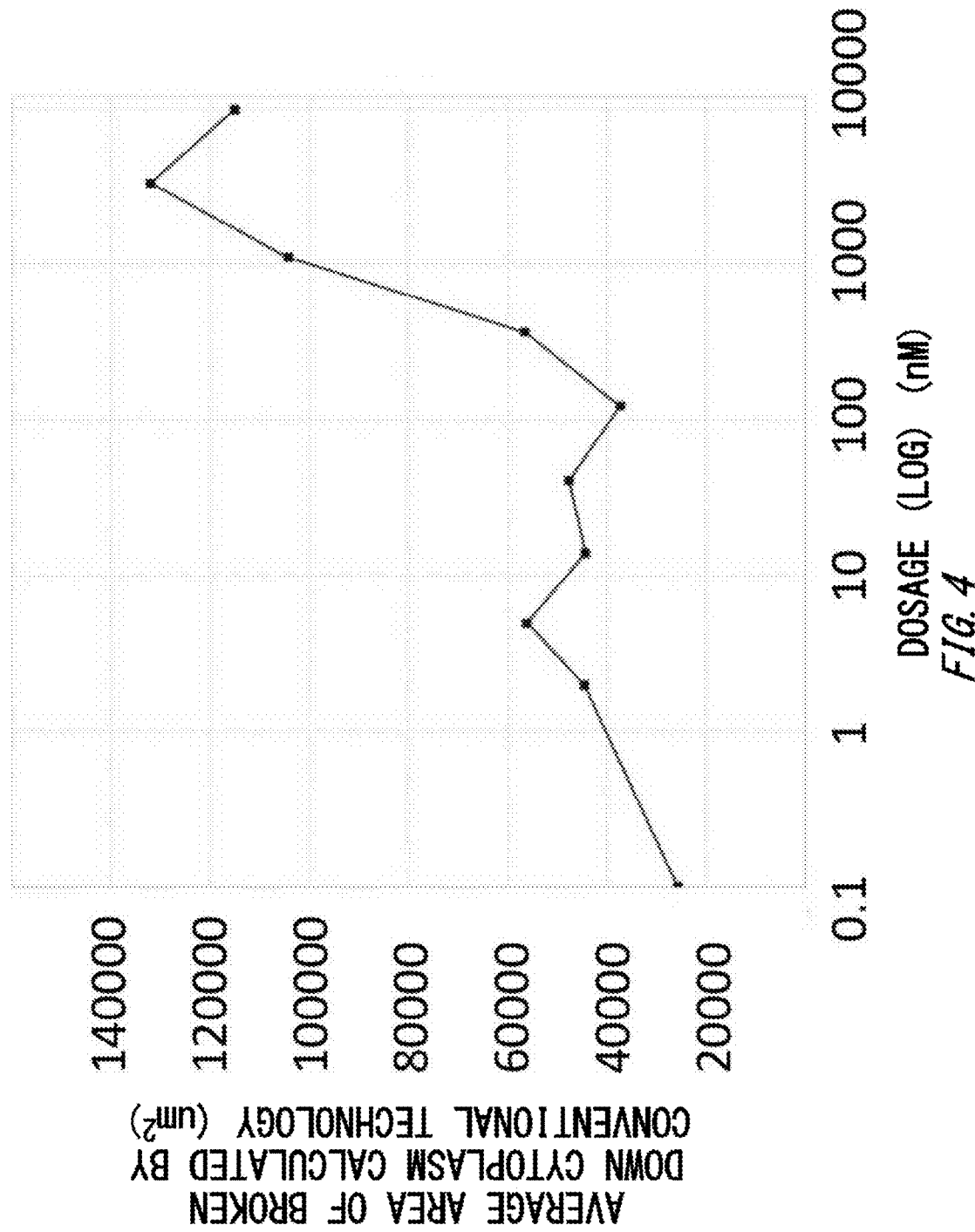
FIG. 4 shows a relationship between the dosage administered and the area of broken down cytoplasm calculated by conventional technology.

FIG. 4 shows the relationship between the administered dosage and the area of the broken down cytoplasm calculated by a conventional technology. In the figure, the horizontal axis indicates the dosage (nM) on a logarithmic scale, and the vertical axis indicates the average area of broken down cytoplasm. The plot in the figure shows the result of analysis by an operator of the images that have been captured in the wells in which the drug has been administered in the dosages of 0, 2, 5, 14, 41, 123, 370, 1,111, 3,333, and 10,000 (nM). In this example, the area changes sharply and the 50% reaction of the drug occurs between 370 nM and 1,111 nM.

Figure 5:
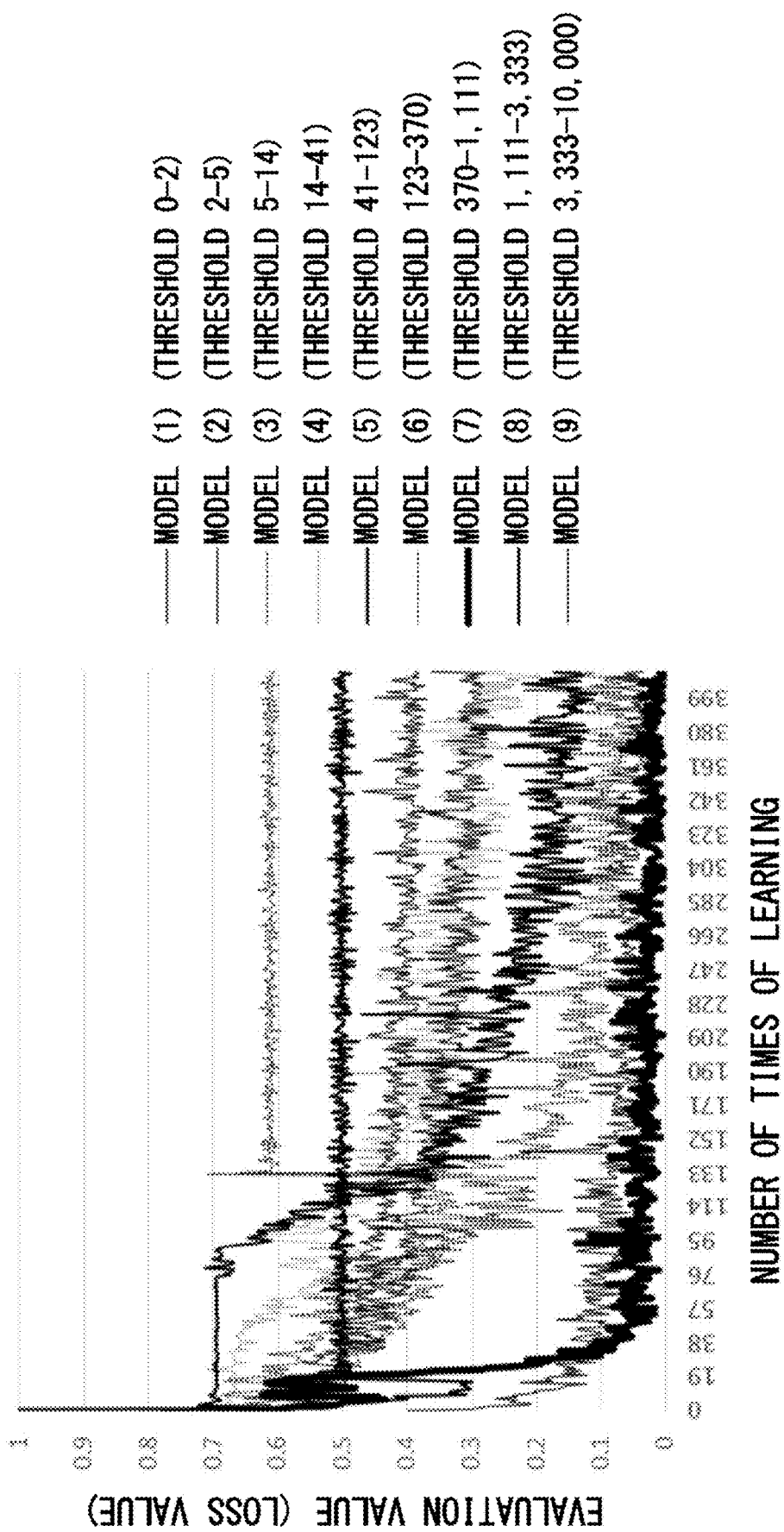
FIG. 5 shows relationships between the number of times of learning and the evaluation value for each of an estimation model 25.

FIG. 5 shows, for each estimation model 25, the relationship between the number of times of learning and the evaluation value. Each graph in the figure shows the relationship between number of times of learning and the evaluation value (in the present figure, the loss value) of the estimation model 25 (1) subjected to learning processing using the learning data set in which the threshold is set between dosages 0 and 2 (nM), the estimation model 25 (2) subjected to learning processing using the learning data set in which the threshold is set between dosages 2 and 5 (nM), the estimation model 25 (3) subjected to learning processing using the learning data set in which the threshold is set between dosages 5 and 14 (nM), the estimation model 25 (4) subjected to learning processing using the learning data set in which the threshold is set between dosages 14 and 41 (nM), the estimation model 25 (5) subjected to learning processing using the learning data set in which the threshold is set between dosages 41 and 123 (nM), the estimation model 25 (6) subjected to learning processing using the learning data set in which the threshold is set between dosages 123 and 370 (nM), the estimation model 25 (7) subjected to learning processing using the learning data set in which the threshold is set between dosages 370 and 1,111 (nM), the estimation model 25 (8) subjected to learning processing using the learning data set in which the threshold is set between dosages 1,111 and 3,333 (nM), and the estimation model 25 (9) subjected to learning processing using the learning data set in which the threshold is set between dosages 3,333 and 10,000 (nM). In the figure, the horizontal axis indicates the number of times of learning and the vertical axis indicates the evaluation value.

According to this figure, it can be seen that the evaluation value of the estimation model 25 (7) subjected to learning processing using the learning data set in which the threshold is set between dosages 370 and 1,111 (nM) is smallest, and that the occurrence parameter value exists between the dosages 370 and 1,111 nM.

[4. Modified example] It is noted that in the embodiment described above, although the learning apparatus 2 is described including the determination portion 27 and the input/output interface 28, the learning apparatus 2 may not include at least one of these.

In addition, although the system 1 is described including the operation apparatus 3, the system 1 may not include the operation apparatus 3. In addition, although a description has been given of the operation apparatus 3 being separate from the learning apparatus 2, the operation apparatus 3 may be integral with the learning apparatus 2.

In addition, although a description has been given of each attribute value of the estimation model 25 in which the probability that an input image has the attribute value is estimated, with respect to all of the attribute values, the probability that the input image has the attribute value may not be estimated. For example, in the case where there are only two attribute values that are $X_1$ and $X_2$, the estimation model 25 may estimate, with respect to only one attribute value $X_1$, a probability $P_1$ that the input image has the attribute value $X_1$. In this case, since it is possible to calculate a probability $P_2$ that the input image has the other attribute value $X_2$ using $P_2=1-P_1$, the evaluation value output portion 26 may calculate the probability $P_2$.

In addition, although the estimation model 25 is described as being configured to output the estimation probability of 0 to 1 for each of the images, the estimation model 25 may output the attribute value that is 0 or 1. For example, the estimation model 25 may calculate a value that is closer to 0 as the input image is farther from the image of the occurrence state of the target event, and calculate a value that is closer to 1 as the input image is closer to the image of the occurrence state, and output 1 as the attribute value when the value is greater than the threshold (for example, greater than 0.5) and output 0 as the attribute value when the value is smaller than the threshold.

In this case, the evaluation value output portion 26 may use the estimated attribute value itself as the estimation probability of the attribute value. For example, when "1" is output as the attribute value, the evaluation value output portion 26 may output the estimation probability of the attribute value "1" as 1.00 (=100%) and the estimation probability of the attribute value "0" as 0 (0%). In this case, it is possible for the evaluation value output portion 26 to calculate the evaluation value in the same way as the embodiment described above. Alternately, the evaluation value output portion 26 may use the amount of deviation between the estimated attribute value and the attribute value that has been given to the image as the estimation error, and use the average or the like of the estimation errors of the plurality of images as the evaluation value.

In addition, in the embodiment described above, although the learning apparatus 2 is described as being configured to perform learning processing by associating each of a plurality of estimation models having the same initial condition with a different learning data set one-to-one, the learning apparatus 2 may perform learning processing by associating each of a random plurality of estimation models having initial conditions that vary from each other with a different learning data set one-to-one. Even in such a case, if the learning processing converges, it is possible to determine the occurrence parameter.

In addition, in the embodiment described above, although the learning apparatus 2 is described including the estimation model 25 for each of a plurality of learning data sets, that is, including the same number of estimation models 25 as the plurality of learning data sets, the number of learning data sets and the number of estimation models 25 may vary.

For example, the learning apparatus 2 may include a number of estimation models 25 that is less than the number of learning data sets. For example, the learning apparatus 2 may include only one estimation model 25. In this case, the learning processing portion 22 may use each learning data set to sequentially perform learning processing on the estimation model 25, and reset the estimation model 25 for each time the evaluation value output portion 26 outputs the evaluation value.

In addition, the learning apparatus 2 may include two estimation models 25. In this case, the learning processing portion 22 may use a first learning data set to perform learning processing one of the estimation models 25, and use a second learning data set to perform learning processing on the other estimation model 25. The learning processing portion 22 may reset the estimation model 25, among the one estimation model 25 and the other estimation model 25, having the higher evaluation value (in the present embodiment, for example, the loss value), and perform learning processing on the estimation model 25 using a third learning data set. Thereafter, the learning processing portion 22 may reset the estimation model 25 having the higher evaluation value and perform learning processing using each of the remaining learning data sets. In this case, the determination portion 27 may finally determine the occurrence parameter value based on the threshold corresponding to the estimation model 25 having the lower evaluation value.

In addition, the learning apparatus 2 may include a greater number of estimation models 25 than the number of learning data sets. For example, the learning apparatus 2 may include, for each learning data set, a plurality of estimation models 25 having varying initial conditions. For example, the learning apparatus 2 may include, for each set of initial conditions, the same number of estimation models 25 as the number of learning data sets. In this case, the learning processing portion 22 uses each learning data set to perform learning processing on each estimation model 25 corresponding to the learning data set for a number of times that is less than the first reference number of times (for example, 20 to 400 times). Then, the learning processing portion 22 may further perform learning processing for the first reference number of times only on the estimation models 25 of a set of initial conditions, among the estimation models 25 of each set of initial conditions, having the greatest number of estimation models 25 having an evaluation value (in the present embodiment, for example, the loss value) that is a fourth reference value (for example, 0.4) or less. Alternately, the learning processing portion 22 may perform learning processing for the first reference number of times in the same way for each estimation model 25. In this case, the determination portion 27 may determine the occurrence parameter value based on the threshold that is greatest in number among thresholds each corresponding to the estimation model 25 having an evaluation value that is a second reference value (for example, 0.2) or less. For example, when the thresholds corresponding to estimation models 25 each having evaluation values that are 0.2 or less are "1", "1", and "4", the determination portion 27 may determine the occurrence parameter based on the threshold "1" that is greatest in number.

In addition, in the embodiment described above, the learning processing portion 22 is described as being configured to perform learning processing multiple times, the multiple times being the first reference number of times, and the determination portion 27 determines the value of the occurrence parameter based on the threshold corresponding to the estimation model 25 having the smallest evaluation value. Alternately, the learning processing portion 22 may perform learning processing on each estimation model 25 repeatedly for an indefinite number of times using the corresponding learning data set, and the determination portion 27 may determine the occurrence parameter value based on the threshold, among the plurality of thresholds, corresponding to the estimation model 25 having the evaluation value that becomes the second reference value or less with the smallest number of times of learning. In this case, the learning processing portion 22 may perform learning processing for a plurality of estimation models 25 in parallel, may perform the learning processing once or multiple times sequentially, and the evaluation value output portion 26 may output the evaluation value of each estimation model 25 that has been subjected to learning processing for the same number of times. When the evaluation value (in the present embodiment, for example, the loss value) of any estimation model 25 becomes the second reference value (for example, 0.2) or less, the determination portion 27 may end the processing by the learning processing portion 22 and the evaluation value output portion 26 and determine the occurrence parameter value.

In addition, when learning processing is performed an indefinite number of times as described above, the learning processing portion 22 may not necessarily perform learning processing using all of the learning data sets. For example, the learning processing portion 22 may perform learning processing on the estimation model 25 using the estimation model 25 corresponding to some of the learning data sets corresponding to every predetermined number of thresholds (for example, every other threshold). When none of the evaluation values of the estimation models 25 are the second reference value or less, the learning processing portion 22 may use the learning data set corresponding to the each of the remaining thresholds to perform learning processing on each corresponding estimation model 25. The learning processing portion 22 may use some of the learning data sets to perform learning processing on each corresponding estimation model 25, detect the corresponding threshold of the estimation model 25 having the smallest evaluation value, or detect the corresponding threshold of the estimation model 25 having an evaluation value that is smaller than a third reference value (for example, 0.4 or 0.3), and use the learning data set corresponding to a reference number (for example, two) of thresholds that are each close to the detected threshold to perform learning processing on each corresponding estimation model 25. The learning processing portion 22 may use at least some of the learning data sets to perform learning processing on each corresponding estimation model 25, and end learning processing on each estimation model 25 having an evaluation value (in the present embodiment, for example, the loss value) that is 0.4 or more when the learning processing has been performed a second reference number of times (for example, 20 times), and further perform learning processing only on each estimation model 25 having an evaluation value that is less than 0.4. In these cases, when the evaluation value of any estimation model 25 becomes the second reference value or less, the determination portion 27 may determine the occurrence parameter value based on the threshold corresponding to the estimation model 25. As a result, it is possible to obtain the occurrence parameter value early by reducing arithmetic processing.

In addition, in the embodiment described above, although the generation portion 21 has been described as being configured to generate all of the learning data sets at once, the generation portion 21 may generate, in stages, only the learning data set that is necessary in learning processing. For example, when the learning processing portion 22 performs learning processing using varying learning data sets in stages as described above, the generation portion 21 may only generate the learning data set that is used in the learning processing.

In addition, in the embodiment described above, although a description has been given having one parameter that affects the occurrence of the target event, there may be a plurality of parameters. For example, when the target event is the drug reaction, the plurality of parameters may be at least two of the dosage, the exposure time, and the temperature. In addition, when the target event is the change in a subject, the plurality of parameters may be the respective dosages of a plurality of drugs.

When the plurality of parameters exist, the obtainment portion 20 may obtain a plurality of images corresponding to respective values of each of the plurality of parameters that affect the occurrence of the target event. In addition, the generation portion 21 may generate, for each of a plurality of combinations of thresholds relating to the plurality of parameters, the learning data set in which each of the plurality of images is given an attribute value, the attribute value varying based on whether each of the thresholds included in each of the combinations is exceeded. For example, when there is an N number of thresholds for the dosage, and an M number of thresholds for the exposure time, the generation portion 21 may generate the learning data set in which each of the images is given an attribute value that varies based on whether an n-th threshold (where n is an integer satisfying $1 \leq n \leq N$) relating to the dosage is exceeded, and the learning data set in which each of the images is given an attribute value that varies based on whether an m-th threshold (where m is an integer satisfying $1 \leq m \leq M$) relating to the exposure time is exceeded, for each combination of (n, m). As a result, it is possible to determine the occurrence parameter value for each parameter.

In addition, in the embodiment described above, although the description has been given having one target event, there may be a plurality of target events. For example, the plurality of target events may be a plurality of reactions of one or a plurality of drugs. The plurality of reactions may be the main effect or a side effect of the drug. The plurality of reactions may be a drug reaction occurring in stages (for example, in a first stage the subject expands, and in a second stage the subject collapses, or the like).

In the case where the plurality of target events exists, the obtainment portion 20 may obtain a plurality of images corresponding to respective values of one or each of a plurality of parameters (for example, the dosage and the exposure time) that affect the occurrence of the plurality of target events. In addition, the generation portion 21 may generate, for each of a plurality of combinations of thresholds relating to each parameter of each of the plurality of target events, the learning data set in which each of the plurality of images is given an attribute value, the attribute value varying based on whether each of the thresholds included in each of the combinations is exceeded.

For example, a description is given of a case where, when there are an N number of thresholds for the dosage, and there are an M number of thresholds for the exposure time, the target events are two reactions that are the reaction of the main effect and the reaction of the side effect. In this case, the generation portion 21 may generate, the learning data set in which, with respect to the reaction of the main effect, each of the images is given an attribute value that varies based on whether an $n_1$-th threshold (where $n_1$ is an integer satisfying $1 \leq n_1 \leq N$) relating to the dosage is exceeded, and each of the images is given an attribute value that varies based on whether an $m_1$-th threshold (where $n_1$ is an integer satisfying $1 \leq m_1 \leq M$) relating to the exposure time is exceeded, and with respect to the reaction of the side effect, each of the images is given an attribute value that varies based on whether an $n_2$-th threshold (where $n_2$ is an integer satisfying $1 \leq n_2 \leq N$) relating to the dosage is exceeded, and each of the images is given an attribute value that varies based on whether an $m_2$-th threshold (where $m_2$ is an integer satisfying $1 \leq m_2 \leq M$) relating to the exposure time is exceeded, for each combination of ($n_1$, $m_1$, $n_2$, $m_2$). However, the threshold numbers $n_1$ and $n_2$ and the numerical values $m_1$ and $m_2$ may satisfy $n_1 \neq n_2$ and $m_1 \neq m_2$, and may satisfy $n_1 < n_2$ and $m_1 < m_2$.

In addition, when the plurality of target events exists, the learning processing portion 22 may perform learning processing, for each learning data set generated by the generation portion 21, on the estimation model 25 that estimates the attribute (for example, the estimation probability of each attribute value) of each of the images for each target event in response to the input of the image. For example, the estimation model 25 may estimate, in response to the input of one image, the estimation probability of each attribute value of one target event and the estimation probability of each attribute value of the other target event. As a result, it is possible to obtain the occurrence parameter value of each target event.

In addition, in the embodiment described above, although the generation portion 21 has been described including all of the obtained images in each learning data set, the generation portion 21 may only include some of the images in each learning data set. For example, the generation portion 21 may generate, for each of a plurality of thresholds, the learning data set using images, among the plurality of obtained images, that respectively correspond to the parameter setting values within a range including the threshold. The range including the threshold may be a range including the threshold at the center. In addition, the range including the threshold may be a range that is set such that, among the parameter setting values respectively corresponding to the images, the number of parameter setting values that are greater than or equal to the threshold included in the range, and the number of parameter setting values that are less than the threshold included in the range are the same. The generation portion 21 may generate the learning data set by setting such a range and extracting only the images, among the plurality of obtained images, that respectively correspond to the parameter setting values in the range.

In this case, in comparison to when all of the images are used, it is possible to shorten the time of generating the learning data set and the processing time of the learning processing. In addition, unlike the case where images that correspond to values of the parameter that are not included in the range including the threshold are used in the learning data set, images having respective attribute values having high correlation with the occurrence of the target event are always included in the learning data set, even if the threshold itself does not correspond with the occurrence parameter. Thereby, it is possible to prevent the evaluation values of all of the thresholds from being low, and prevent the estimation accuracy from consequently being rated highly at evaluation. Therefore, it is possible to accurately determine the occurrence parameter value. Such an effect becomes particularly prominent when the values of the parameter and the occurrence of the target event are expressed by a step function.

In addition, in the case where only some of all of the obtained images are included in the learning data set, the evaluation value output portion 26 may calculate the evaluation value using the images that are not included in the learning data set. As a result, the learning processing portion 22 and the evaluation value output portion 26 may perform cross-validation in cooperation.

In addition, in the embodiment described above, although the determination portion 27 is described as being configured to use the threshold itself corresponding to the estimation model 25 having the smallest evaluation value as the occurrence parameter value, the determination portion 27 may use another value as the occurrence parameter value as long as it is based on the threshold. For example, the determination portion 27 may use, as the occurrence parameter value, a parameter setting value among the plurality of parameter setting values that is closest to the threshold corresponding to the estimation model 25 having the smallest evaluation value, and is greater than the threshold (or a parameter setting value that is smaller than the threshold). In this case, the learning processing portion 22 may use a learning data set having the occurrence parameter value as the threshold to perform learning processing of the estimation model 25 anew. In addition, the input/output interface 28 may supply, to the operation apparatus 3, the estimation model 25 on which learning processing has been performed in this way.

In addition, in the embodiment described above, although a description has been giving in which the target reaction is the drug reaction, the parameters that affect the occurrence of the target event are the dosage and the exposure time, and the subject of the images corresponding to the respective values of the parameter is the cell, the application target of the learning apparatus 2 is not limited to this. For example, the target event may be the maturity of a crop, and the parameters that affect the occurrence of the target event may be amount of sunlight, amount of rainfall, or the amount of sprayed pesticides, and the subject of the images corresponding to the respective values of the parameter may be an overhead view of the crop.

Also, various embodiments according to the present invention may be described with reference to flow charts and block diagrams. Blocks herein may illustrate (1) steps of processes of executing operations or (2) sections in a device responsible for executing operations. Particular steps and sections may be implemented by a dedicated circuitry, a programmable circuitry that is supplied together with computer-readable instructions stored on a computer-readable medium, and/or by a processor that is supplied together with computer-readable instructions stored on a computer-readable medium. The dedicated circuitry may include digital and/or analog hardware circuits. It may also include integrated circuits (IC) and/or discrete circuits. The programmable circuitry may include reconfigurable hardware circuits that include a logical AND, a logical OR, a logical XOR, a logical NAND, a logical NOR, other logical operations, a flip-flop, a register, and memory elements such as a field-programmable gate array (FPGA) and a programmable logic array (PLA).

The computer-readable medium may include any tangible device that can store instructions to be executed by an appropriate device. As a result, the computer-readable medium having the instructions stored on the device incorporates a product including instructions that can be executed in order to create means for executing operations specified in the flow charts or the block diagrams. Examples of the computer-readable medium may include: an electronic storage medium; a magnetic storage medium; an optical storage medium; an electromagnetic storage medium; and a semiconductor storage medium. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

The computer-readable instruction may be provided to a processor of general purpose computer, a special purpose computer, another programmable a data-processing device, or to a programmable circuitry, locally, via local area network (LAN), or wide area network (WAN) such as the Internet. The computer-readable instruction may be executed in order to create means for executing operations specified by the flow charts or block diagrams. Examples of processors include computer processors, processing units, microprocessors, digital signal processors, controllers, microcontrollers, etc.

Figure 6:
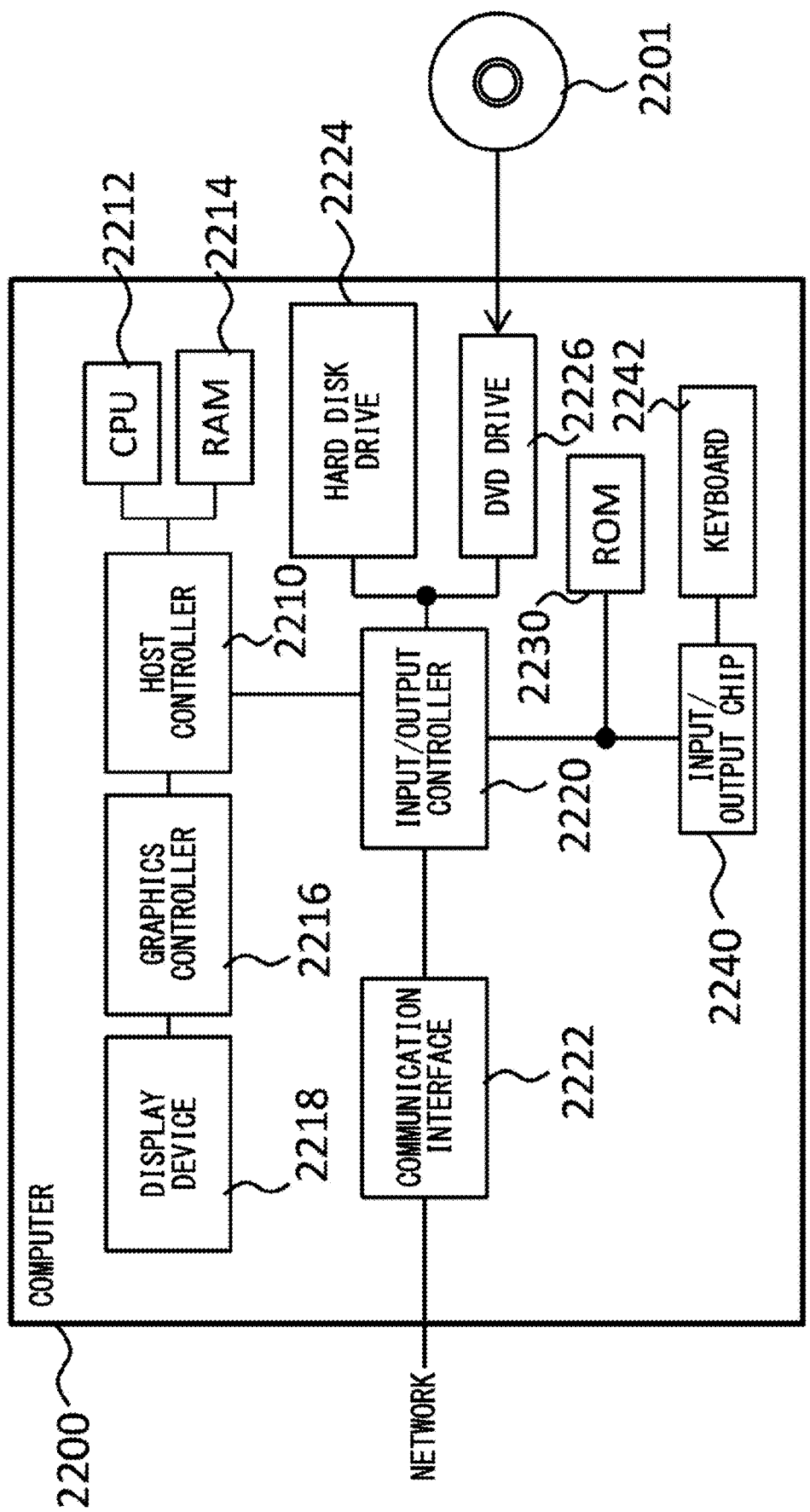
FIG. 6 shows an example of a computer 2200 in which a plurality of aspects of the present invention may be embodied in whole or in part.

FIG. 6 shows an exemplary computer 2200 in which a plurality of aspects of the present invention may be embodied wholly or partially. A program that is installed in the computer 2200 can cause the computer 2200 to function as or perform operations associated with apparatuses of the embodiments of the present invention or one or more sections thereof, and/or cause the computer 2200 to perform processes of the embodiments of the present invention or steps thereof. Such programs may be executed by a CPU 2212 in order to cause the computer 2200 to execute particular operations associated with some or all of the flow charts and the blocks of the block diagrams described herein.

The computer 2200 according to the present embodiment includes the CPU 2212, a RAM 2214, a graphics controller 2216, and a display device 2218, and they are connected to each other with a host controller 2210. The computer 2200 also include input/output units such as a communication interface 2222, a hard disk drive 2224, a DVD-ROM drive 2226, and an IC card drive, and they are connected to the host controller 2210 via an input/output controller 2220. The computer also includes legacy input/output units such as a ROM 2230 and a keyboard 2242, and they are connected to the input/output controller 2220 via an input/output chip 2240.

The CPU 2212 operates according to programs stored in the ROM 2230 and the RAM 2214 and thereby controls each unit. The graphics controller 2216 acquires image data generated by the CPU 2212 on a frame buffer or the like provided in the RAM 2214, or in the graphics controller 2216, to display the image data on the display device 2218.

The communication interface 2222 communicates with another electronic device via network. The hard disk drive 2224 stores programs and data used by the CPU 2212 in the computer 2200. The DVD-ROM drive 2226 reads out programs or data from a DVD-ROM 2201 and provides the programs or data to the hard disk drive 2224 via the RAM 2214. The IC card drive reads out programs and data from an IC card and/or writes programs and data into the IC card.

The ROM 2230 stores therein a boot program and the like to be executed by the computer 2200 at the time of activation and/or a program that depends on hardware of the computer 2200. The input/output chip 2240 may also connect various input/output units to the input/output controller 2220 via a parallel port, a serial port, a keyboard port, a mouse port, or the like.

Programs are provided by a computer-readable medium such as the DVD-ROM 2201 or the IC card. The programs are read out from the computer-readable medium and installed on the hard disk drive 2224, the RAM 2214, or the ROM 2230, which are also examples of the computer-readable medium, to be executed by the CPU 2212. The information processing described in these programs is read out by the computer 2200 to provide linkage between the programs and the above-described various types of hardware resources. An apparatus or method may be constituted by realizing the operation or processing of information in accordance with the usage of the computer 2200.

For example, in a case where communication is executed between the computer 2200 and an external device, the CPU 2212 may execute a communication program loaded into the RAM 2214 and instructs the communication interface 2222 to implement the communication processing according to processing described in the communication program. Under control of the CPU 2212, the communication interface 2222 reads out transmission data stored in a transmission buffer processing region provided in a recording medium such as the RAM 2214, the hard disk drive 2224, the DVD-ROM 2201, or the IC card, and then sends the read transmission data to network or writes data received from the network into a reception buffer processing region provided in the recording medium or the like.

Also, the CPU 2212 may operate such that all or a necessary portion of a file or database stored on an external recording medium such as the hard disk drive 2224, the DVD-ROM drive 2226 (DVD-ROM 2201) or the IC card is read by the RAM 2214. Then, it may execute various types of processing on data in the RAM 2214. The CPU 2212 subsequently writes back the processed data to the external recording medium.

Various types of information such as various types of programs, data, tables, and databases may be stored on a recording medium, and then information processing may be performed on the information. On data read out from the RAM 2214, the CPU 2212 may execute various types of processing which include various types of operations, information processing, conditional judgement, conditional branch, unconditional branch, information searching/replacement, and the like as described throughout in the disclosure herein or specified by instruction sequences of programs. Then, the CPU 2212 writes back the result into the RAM 2214. Also, the CPU 2212 may search for information in files, database, or the like in a recording medium. For example, in a case where a recording medium stores a plurality of entries each having an attribute value of a first attribute associated with an attribute value of a second attribute, the CPU 2212 may search an entry, out of the plurality of entries, that has an attribute value of the first attribute matching a specified condition. Then, the CPU 2212 may read out an attribute value of the second attribute stored in the entry and acquire the attribute value of the second attribute associated with the first attribute that satisfies the predetermined condition.

The above-described programs or the software modules may be stored in a computer-readable medium in or near the computer 2200. Also, a recording medium such as a hard disk or a RAM provided in a server system that is connected to a dedicated communication network or the Internet can be used as the computer-readable medium, whereby a program is provided to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1 System, 2 Learning apparatus, 3 Operation apparatus, 20 Obtainment portion, 21 Generation portion, 22 Learning processing portion, 25 Estimation model, 26 Evaluation value output portion, 27 Determination portion, 28 Input/output interface, 30 Obtainment portion, 35 Estimation model, 250 Storage portion, 350 Storage portion, 2200 Computer, 2201 DVD-ROM, 2210 Host controller, 2212 CPU, 2214 RAM, 2216 Graphics controller, 2218 Display device, 2220 Input/output controller, 2222 Communication interface, 2224 Hard disk drive, 2226 DVD-ROM drive, 2230 ROM, 2240 Input/output chip, 2242 Keyboard, 3333 Dosage

What is claimed is:

1. An apparatus, comprising:
   an obtainment portion configured to obtain a plurality of images corresponding to respective values of at least one of dosage, temperature, and exposure time of a drug that affects occurrence of a reaction of the drug;
   a generation portion configured to generate, for each of a plurality of thresholds relating to the at least one of the dosage, temperature, and exposure time, a learning data set in which at least a part of the plurality of images is each given an attribute value, the attribute value varying corresponding to whether or not the at least one of the dosage, temperature, and exposure time exceeds the threshold;
   a learning processing portion configured to perform, for each generated learning data set, learning processing on an estimation model that estimates the attribute value of an image in response to input of the image;
   an evaluation value output portion configured to output, for each estimation model, an evaluation value according to an estimation error of the estimation model; and
   a determination portion configured to determine a value of the at least one of the dosage, temperature, and exposure time at which the reaction of the drug occurs based on the threshold, among the plurality of thresholds, corresponding to the estimation model having the smallest evaluation value.

2. The apparatus according to claim 1, wherein
the learning processing portion repeatedly performs learning processing on each estimation model using the corresponding learning data set; and
the apparatus further comprises
a determination portion configured to determine a value of the at least one of the dosage, temperature, and exposure time at which the reaction of the drug occurs based on a threshold, among the plurality of thresholds, corresponding to the estimation model in which the evaluation value becomes less than or equal to a reference value with the smallest number of times of learning.

3. The apparatus according to claim 1, wherein
the generation portion generates the learning data set for each of the plurality of thresholds using images, among the plurality of images, corresponding to values of the at least one of the dosage, temperature, and exposure time, the values being within a range including the threshold.

4. The apparatus according to claim 1, wherein
the obtainment portion obtains a plurality of images corresponding to respective values of each of the at least one of the dosage, temperature, and exposure time that affect occurrence of the reaction of the drug, and
the generation portion generates, for each of a plurality of combinations of thresholds relating to the at least one of the dosage, temperature, and exposure time, the learning data set in which each of the plurality of images is given an attribute value, the attribute value varying based on whether each of the thresholds included in each of the combinations is exceeded.

5. The apparatus according to claim 1, wherein
the learning processing portion performs learning processing on each of a plurality of estimation models having the same initial condition, using a corresponding one of a plurality of learning data sets generated for the plurality of thresholds.

6. The apparatus according to claim 1, wherein
the learning processing portion performs transfer learning using a model on which learning processing has been performed as the estimation model.

7. The apparatus according to claim 1, wherein
the estimation model estimates the attribute value of an image in response to input of the image.

8. The apparatus according to claim 1, wherein
in response to input of an image, the estimation model estimates, for at least one attribute value, a probability that the image has the attribute value.

9. A method, comprising:
obtaining a plurality of images corresponding to respective values of at least one of dosage, temperature, and exposure time of a drug that affects occurrence of a reaction of the drug;
generating, for each of a plurality of thresholds relating to the at least one of the dosage, temperature, and exposure time, a learning data set in which at least a part of the plurality of images is each given an attribute value, the attribute value varying corresponding to whether or not the at least one of the dosage, temperature, and exposure time exceeds the threshold;

performing, for each generated learning data set, learning processing on an estimation model that estimates the attribute value of an image in response to input of the image;

outputting, for each estimation model, an evaluation value according to an estimation error of the estimation model; and determining a value of the at least one of the dosage, temperature, and exposure time at which the reaction of the drug occurs based on the threshold, among the plurality of thresholds, corresponding to the estimation model having the smallest evaluation value.

10. A non-transitory recording medium having recorded thereon a set of computer-readable instructions that causes a computer to perform operations comprising:

obtaining a plurality of images corresponding to respective values of at least one of dosage, temperature, and exposure time of a drug that affects occurrence of a reaction of the drug;

generating, for each of a plurality of thresholds relating to the at least one of the dosage, temperature, and exposure time, a learning data set in which at least a part of the plurality of images is each given an attribute value, the attribute value varying corresponding to whether or not the at least one of the dosage, temperature, and exposure time exceeds the threshold;

performing, for each generated learning data set, learning processing on an estimation model that estimates the attribute value of an image in response to input of the image;

outputting, for each estimation model, an evaluation value according to an estimation error of the estimation model; and determining a value of the at least one of the dosage, temperature, and exposure time at which the reaction of the drug occurs based on the threshold, among the plurality of thresholds, corresponding to the estimation model having the smallest evaluation value.

* * * * *